United States Patent
Geyer et al.

(10) Patent No.: US 12,252,885 B2
(45) Date of Patent: *Mar. 18, 2025

(54) ROOFING MEMBRANE WITH INTEGRATED SURFACE REINFORCEMENT

(71) Applicant: Garland Industries, Inc., Cleveland, OH (US)

(72) Inventors: Julie Anne Geyer, Cleveland, OH (US); Melissa Rus, Cleveland, OH (US); Jason Smith, Cleveland, OH (US)

(73) Assignee: Garland Industries, Inc., Independence, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,814

(22) Filed: Nov. 9, 2023

(65) Prior Publication Data
US 2024/0093496 A1 Mar. 21, 2024

Related U.S. Application Data

(63) Continuation of application No. 18/106,738, filed on Feb. 7, 2023, now Pat. No. 11,814,847, which is a
(Continued)

(51) Int. Cl.
*B32B 7/03* (2019.01)
*B32B 5/02* (2006.01)
(Continued)

(52) U.S. Cl.
CPC ............... *E04D 5/10* (2013.01); *B32B 5/022* (2013.01); *B32B 5/024* (2013.01); *B32B 7/03* (2019.01);
(Continued)

(58) Field of Classification Search
CPC . B32B 11/10; B32B 2255/02; B32B 2255/26; B32B 2262/0261; B32B 2262/0276; B32B 2262/04; B32B 2262/101; B32B 2262/106; B32B 2274/00; B32B 2307/3065; B32B 2307/7265; B32B 2307/732; B32B 2307/748; B32B 2419/06; B32B 25/10; B32B 25/12; B32B 25/14; B32B 27/12; B32B 27/306; B32B 27/308; B32B 27/32; B32B 27/34; B32B 27/36;
(Continued)

(56) References Cited

U.S. PATENT DOCUMENTS

4,039,706 A 8/1977 Tajima et al.
4,342,804 A 8/1982 Meynard
(Continued)

*Primary Examiner* — Lawrence D Ferguson
(74) *Attorney, Agent, or Firm* — UB Greensfelder LLP; Brian E. Turung (57) ABSTRACT

A surface-reinforced bitumen roofing membrane includes at least two layers, namely 1) a bitumen compound layer, and 2) a fiber mat, and can optionally include a) an optional bleed blocker layer that is located between the bitumen compound layer and the fiber mat, b) an optional liquid applied coating that partially or fully encapsulates the fiber mat, c) an optional release liner that is releasably positioned on the bottom surface of the bitumen roofing membrane, and/or d) an optional release film that is releasably positioned on the fiber mat surface.

25 Claims, 2 Drawing Sheets

Related U.S. Application Data continuation of application No. 17/591,832, filed on Feb. 3, 2022, now Pat. No. 11,591,798.

(60) Provisional application No. 63/172,206, filed on Apr. 8, 2021.

(51) Int. Cl.
  *B32B 7/05* (2019.01)
  *B32B 7/06* (2019.01)
  *B32B 11/10* (2006.01)
  *E04D 5/10* (2006.01)

(52) U.S. Cl.
  CPC .............. *B32B 7/05* (2019.01); *B32B 7/06* (2013.01); *B32B 11/10* (2013.01); *B32B 2255/02* (2013.01); *B32B 2262/101* (2013.01); *B32B 2307/3065* (2013.01); *B32B 2419/06* (2013.01)

(58) Field of Classification Search
  CPC .......... B32B 27/40; B32B 5/022; B32B 5/024; B32B 7/03; B32B 7/05; B32B 7/06; B32B 7/12; B32B 9/043; B32B 9/047; E04D 5/02; E04D 5/10
  See application file for complete search history.

(56) References Cited

U.S. PATENT DOCUMENTS

| | | |
|---|---|---|
| 5,456,785 A | 10/1995 | Venable |
| 5,643,399 A | 7/1997 | Venable |
| 6,296,912 B1 | 10/2001 | Zickell |
| 6,502,360 B2 | 1/2003 | Carr et al. |
| 7,803,725 B2 | 9/2010 | Payne et al. |
| 11,591,798 B2* | 2/2023 | Geyer ................ B32B 27/36 |
| 2011/0223385 A1 | 9/2011 | Shiao et al. |

* cited by examiner

ROOFING MEMBRANE WITH INTEGRATED SURFACE REINFORCEMENT

The present application is a continuation of U.S. application Ser. No. 18/106,738 filed Feb. 7, 2023, which in turn is a continuation of U.S. application Ser. No. 17/591,832 filed Feb. 3, 2022, now U.S. Pat. No. 11,591,798, which in turn claims priority on U.S. Provisional Application Ser. No. 63/172,206 filed Apr. 8, 2021, which are incorporated herein by reference.

FIELD OF DISCLOSURE

The present disclosure is directed to an improved roofing membrane system; particularly the present disclosure is directed to a surface-reinforced bitumen roofing membrane; particularly the present disclosure is directed to a surface-reinforced bitumen roofing membrane that includes a surface reinforcement layer wherein the surface reinforcement layer may or may not include a liquid applied coating; more particularly the present disclosure is directed to a surface-reinforced bitumen roofing membrane that includes a surface reinforcement layer that comprises multi-directional strand fiber mat wherein the surface reinforcement layer may or may not include a liquid applied coating; still more particularly the present disclosure is directed to a surface-reinforced modified bitumen roofing membrane that includes a surface reinforcement layer that comprises multi-directional strand fiberglass mat wherein the surface reinforcement layer may or may not include a liquid applied coating; and yet still more particularly the present disclosure is directed to a surface-reinforced modified bitumen roofing membrane that includes a surface reinforcement layer that comprises multi-directional strand fiber mat that includes a liquid applied coating that partially or fully encapsulates the surface reinforcement layer.

BACKGROUND OF THE INVENTION

There is a need for a ready-made reinforcement layer for a field-applied liquid coating or a ready-made reinforcement layer that includes a pre-applied applied liquid coating.

Prior art patents that are incorporated herein by reference are U.S. Pat. Nos. 7,803,725; 6,502,360; 6,296,912; 5,643,399; 5,456,785; 4,342,804; and 4,039,706. Several of these references illustrate the attachment of non-woven polymeric fibrous mats to the bottom of single ply sheets or a fibrous mat that is adhered to the top of a self-adhered base sheet.

SUMMARY OF DISCLOSURE

The present disclosure is directed to an improved roofing membrane system; particularly the present disclosure is directed to a surface-reinforced bitumen roofing membrane; particularly the present disclosure is directed to a surface-reinforced bitumen roofing membrane that includes a surface reinforcement layer wherein the surface reinforcement layer may or may not include a liquid applied coating; more particularly the present disclosure is directed to a surface-reinforced bitumen roofing membrane that includes a surface reinforcement layer that comprises multi-directional strand fiber mat wherein the surface reinforcement layer may or may not include a liquid applied coating; still more particularly the present disclosure is directed to a surface-reinforced modified bitumen roofing membrane that includes a surface reinforcement layer that comprises multi-directional strand fiberglass mat wherein the surface reinforcement layer may or may not include a liquid applied coating; and yet still more particularly the present disclosure is directed to a surface-reinforced modified bitumen roofing membrane that includes a surface reinforcement layer that comprises multi-directional strand fiber mat that includes a liquid applied coating that partially or fully encapsulates the surface reinforcement layer.

In one non-limiting embodiment, the surface-reinforced bitumen roofing membrane includes 1) a bitumen compound layer, 2) a fiber mat, and optionally 3) one or more of a) an optional bleed blocker layer that is located between the bitumen compound layer and the fiber mat, b) an optional liquid applied coating that partially or fully encapsulates the fiber mat, c) an optional release liner that is releasably positioned on the bottom surface of the bitumen roofing membrane, and/or d) an optional release film that is releasably positioned on the top surface of the fiber mat.

In another non-limiting embodiment, the surface-reinforced bitumen roofing membrane includes 1) a bitumen compound layer, 2) a fiber mat, and optionally 3) two or more of a) an optional bleed blocker layer that is located between the bitumen compound layer and the fiber mat, b) an optional liquid applied coating that partially or fully encapsulates the fiber mat, c) an optional release liner that is releasably positioned on the bottom surface of the bitumen roofing membrane, and/or d) an optional release film that is releasably positioned on the top surface of the fiber mat.

In another non-limiting embodiment, the surface-reinforced bitumen roofing membrane includes 1) a bitumen compound layer, 2) a fiber mat, and optionally 3) three or more of a) an optional bleed blocker layer that is located between the bitumen compound layer and the fiber mat, b) an optional liquid applied coating that partially or fully encapsulates the fiber mat, c) an optional release liner that is releasably positioned on the bottom surface of the bitumen roofing membrane, and/or d) an optional release film that is releasably positioned on the top surface of the fiber mat.

In another non-limiting embodiment, the surface-reinforced bitumen roofing membrane includes 1) a bitumen compound layer, 2) a fiber mat, and 3) optionally a) an optional bleed blocker layer that is located between the bitumen compound layer and the fiber mat, b) an optional liquid applied coating that partially or fully encapsulates the fiber mat, c) an optional release liner that is releasably positioned on the bottom surface of the bitumen roofing membrane, and d) an optional release film that is releasably positioned on the top surface of the fiber mat.

The Bitumen Compound Layer

The bitumen compound layer includes a primary hydrocarbon compound (e.g., bitumen or asphalt, coal tar); and optionally one or more of a) filler (e.g., calcium carbonate, chalk, clay, dolomite, kaolin, silica, talc, etc.); b) polymer modifier (e.g., APAO [Amorphous Polyolefin], APP [Atactic Polypropylene], EVA [Ethylene Vinyl Acetate], EBA [Ethylene Butyl Acrylate], PPA [Polyphthalamide], PPI [Polymeric Polyisocyanate], PE [Polyethylene], PP [Polypropylene] SEBS [Styrene Ethylene Butadiene Styrene], SBS [Styrene Butadiene Styrene], SIS [Styrene-Isoprene-Styrene], thermoplastic urethane [TPU], etc.); c) hydrocarbon resin or process oil (e.g., naphthenic oil, paraffinic oil, C5-C9 aromatic hydrocarbon, etc.); d) tackifying agent; e) antioxidant; f) stabilizer; g) cross-linkers; h) biocide; i) coloring agent; j) metal flakes; k) adhesion enhancer; l) fire retardant (e.g., alumina trihydrate, ammonium polyphosphate, etc.); m) softening agent; n) wax (e.g., paraffin wax, etc.); o) acid (e.g., stearic acid, etc.); and/or p) reinforcement fibers (e.g., Kevlar®, carbon fibers, fiberglass, boron fibers, etc.).

In one non-limiting embodiment, the primary hydrocarbon compound constitutes 25-90 wt. % (and all values and ranges therebetween) of the bitumen compound layer. In one specific formulation, the primary hydrocarbon compound constitutes 25-80 wt. % of the bitumen compound layer. In another specific formulation, the primary hydrocarbon compound constitutes 25-60 wt. % of the bitumen compound layer. In another specific formulation, the primary hydrocarbon compound constitutes 25-50 wt. % of the bitumen compound layer. In another specific formulation, the primary hydrocarbon compound constitutes 25-49 wt. % of the bitumen compound layer. The primary hydrocarbon compound can be fully formed of bitumen, or can be a mixture of bitumen and coal tar. The type of bitumen used in the bitumen compound layer is non-limiting. In one non-limiting example, the bitumen is PG64-22 grade. In another non-limiting example, the bitumen is bitumen penetration grade 40/50. In another non-limiting example, the bitumen is bitumen penetration grade 50/70. In another non-limiting example, the bitumen is bitumen penetration grade 60/70. In another non-limiting example, the bitumen or blend of bitumen (when used) has a softening point about 43.3-121.1° C. (110-250° F.) (and all values and ranges therebetween); and a penetration typically of about 4-80 dmm (and all values and ranges therebetween) at 22.2° C. (75° F.). In one non-limiting embodiment, the primary hydrocarbon compound includes 25-100 wt. % bitumen (and all values and ranges therebetween) and 0-75 wt. % coal tar (and all values and ranges therebetween). In another non-limiting embodiment, the primary hydrocarbon compound includes 60-100 wt. % bitumen and 0-40 wt. % coal tar (and all values and ranges therebetween). In another non-limiting embodiment, the primary hydrocarbon compound includes 25-90 wt. % bitumen and 10-75 wt. % coal tar.

The filler, when included in the bitumen compound layer, constitutes about 0.5-66 wt. % (and all values and ranges therebetween) of the bitumen compound layer. In one non-limiting formulation, the filler (when used) constitutes 0.5-60 wt. % of the bitumen compound layer. In another non-limiting formulation, the filler (when used) constitutes 10-60 wt. % of the bitumen compound layer. In another non-limiting formulation, the filler (when used) constitutes 25-60 wt. % of the bitumen compound layer. In another non-limiting formulation, the filler (when used) constitutes 10-35 wt. % of the bitumen compound layer. In another non-limiting formulation, the filler (when used) constitutes 25-35 wt. % of the bitumen compound layer. In another non-limiting formulation, the weight percent of filler in the bitumen compound layer (when used) is less than the weight percent of the primary hydrocarbon compound in the bitumen compound layer. The filler can include one or more of calcium carbonate, chalk, clay, dolomite, kaolin, silica, talc, etc.; however, other or additional filler can be used. In one non-limiting formulation, the filler (when used) includes calcium carbonate, silica and/or talc. In another non-limiting formulation, the filler, when used, includes calcium carbonate.

The polymer modifier, when included in the bitumen compound layer, constitutes about 0.05-30 wt. % (and all values and ranges therebetween) of the bitumen compound layer. In one non-limiting formulation, the polymer modifier (when used) constitutes 0.05-25 wt. % of the bitumen compound layer. In another non-limiting formulation, the polymer modifier (when used) constitutes 2-20 wt. % of the bitumen compound layer. In another non-limiting formulation, the polymer modifier (when used) constitutes 2-10 wt. % of the bitumen compound layer. In another non-limiting formulation, the polymer modifier (when used) constitutes 2-8 wt. % of the bitumen compound layer. In another non-limiting formulation, the weight percent of polymer modifier in the bitumen compound layer, when used, is less than the weight percent of the primary hydrocarbon compound in the bitumen compound layer. The polymer modifier can include one or more of APAO (Amorphous Polyolefin), APP (Atactic Polypropylene), EVA (Ethylene Vinyl Acetate), EBA (Ethylene Butyl Acrylate), PPA (Polyphthalamide), PPI (Polymeric Polyisocyanate), PE (Polyethylene), PP (Polypropylene), SEBS (Styrene Ethylene Butadiene Styrene), SBS (Styrene Butadiene Styrene), SIS (Styrene-Isoprene-Styrene), SBR (styrene-butadiene-rubber), thermoplastic urethane (TPU), etc.; however, other or additional polymer modifier can be used. In one non-limiting formulation, the polymer modifier includes SBS and/or polyurethane. In another non-limiting formulation, the polymer modifier includes SBS.

The process oil or hydrocarbon resin, when included in the bitumen compound layer, is about 0.05-30 wt. % (and all values and ranges therebetween) of the bitumen compound layer. In one non-limiting formulation, the process oil or hydrocarbon resin (when used) constitutes 0.05-20 wt. % of the bitumen compound layer. In another non-limiting formulation, the process oil or hydrocarbon resin (when used) constitutes 1-10 wt. % of the bitumen compound layer. In another non-limiting formulation, the process oil or hydrocarbon resin (when used) constitutes 1-5 wt. % of the bitumen compound layer. In another non-limiting formulation, the weight percent of process oil or hydrocarbon resin in the bitumen compound layer (when used) is less than the weight percent of the primary hydrocarbon compound in the bitumen compound layer. The hydrocarbon resin or process oil can include one or more of naphthenic oil, paraffinic oil, C5-C9 aromatic hydrocarbon, etc. In one non-limiting formulation, the hydrocarbon resin or process oil includes naphthenic oil and/or paraffinic oil; however, other or additional hydrocarbon resin or process oil can be used.

The antioxidant, when included in the bitumen compound layer, is about 0.05-30 wt. % (and all values and ranges therebetween) of the bitumen compound layer. In one non-limiting formulation, the antioxidant (when used) constitutes 0.05-5 wt. % of the bitumen compound layer. In another non-limiting formulation, the antioxidant (when used) constitutes 0.05-2 wt. % of the bitumen compound layer. In another non-limiting formulation, the weight percent of antioxidant in the bitumen compound layer (when used) is less than the weight percent of the primary hydrocarbon compound in the bitumen compound layer. The antioxidant can include one or more of aromatic amines, hindered phenolics, phosphites, sulfur-containing compounds (e.g., thioethers, thioesters, etc.); however, other or additional antioxidant can be used.

The UV stabilizer, when included in the bitumen compound layer, is about 0.05-30 wt. % (and all values and ranges therebetween) of the (when used), when used, constitutes 0.05-5 wt. % of the bitumen compound layer. In another non-limiting formulation, the UV stabilizer (when used) constitutes 0.05-2 wt. % of the bitumen compound layer. In another non-limiting formulation, the weight percent of UV stabilizer in the bitumen compound layer (when used) is less than the weight percent of the primary hydrocarbon compound in the bitumen compound layer. The UV stabilizer can include one or more of benzotriazole UV absorber, hindered amine radical scavenge (e.g., Light Stabilizer 770, etc.), layered double hydroxide (LDH), carbon black, etc.; however, other or additional UV stabilizer can be used.

The cross-linkers, when included in the bitumen compound layer, are about 0.05-30 wt. % (and all values and ranges therebetween) of the bitumen compound layer. In one non-limiting formulation, the cross-linkers (when used) constitute 0.05-10 wt. % of the bitumen compound layer. In another non-limiting formulation, the cross-linkers (when used) constitute 0.05-5 wt. % of the bitumen compound layer. In another non-limiting formulation, the weight percent of cross-linkers in the bitumen compound layer (when used) is less than the weight percent of the primary hydrocarbon compound in the bitumen compound layer. The cross-linkers can include one or more of sulfur, sulfur compounds, bismaleimides, polymerizable monofunctional vinyl aromatic monomer (e.g., styrene, etc.), polyfunctional polymerizable vinyl aromatic monomer (e.g., divinylbenzene etc.), etc.; however, other or additional cross-linkers can be used.

The biocide, when included in the bitumen compound layer, is about 0.05-30 wt. % (and all values and ranges therebetween) of the bitumen compound layer. In one non-limiting formulation, the biocide (when used) constitutes 0.05-5 wt. % of the bitumen compound layer. In another non-limiting formulation, the biocide (when used) constitutes 0.05-1 wt. % of the bitumen compound layer. In another non-limiting formulation, the weight percent of biocide in the bitumen compound layer (when used) is less than the weight percent of the primary hydrocarbon compound in the bitumen compound layer. The biocide can include one or more of copper sulfate, zinc chloride, quaternary ammonium-based biocides, aldehydes, hydroxy compounds, o-phthalaldehyde, etc.; however, other or additional biocide can be used.

The coloring agent, when included in the bitumen compound layer, is about 0.05-30 wt. % (and all values and ranges therebetween) of the bitumen compound layer. In one non-limiting formulation, the coloring agent (when used) constitutes 0.05-5 wt. % of the bitumen compound layer. In another non-limiting formulation, the coloring agent (when used) constitutes 0.05-4 wt. % of the bitumen compound layer. In another non-limiting formulation, the weight percent of coloring agent in the bitumen compound layer (when used) is less than the weight percent of the primary hydrocarbon compound in the bitumen compound layer.

The metal flakes, when included in the bitumen compound layer, are about 0.05-30 wt. % (and all values and ranges therebetween) of the bitumen compound layer. In one non-limiting formulation, the metal flakes (when used) constitute 0.05-5 wt. % of the bitumen compound layer. In another non-limiting formulation, the metal flakes (when used) constitute 0.05-2 wt. % of the bitumen compound layer. In another non-limiting formulation, the weight percent of metal flakes in the bitumen compound layer (when used) is less than the weight percent of the primary hydrocarbon compound in the bitumen compound layer.

The adhesion enhancer, when included in the bitumen compound layer, is about 0.05-30 wt. % (and all values and ranges therebetween) of the bitumen compound layer. In one non-limiting formulation, the adhesion enhancer (when used) constitutes 0.05-5 wt. % of the bitumen compound layer. In another non-limiting formulation, the adhesion enhancer (when used) constitutes 0.05-2 wt. % of the bitumen compound layer. In another non-limiting formulation, the weight percent of adhesion enhancer in the bitumen compound layer (when used) is less than the weight percent of the primary hydrocarbon compound in the bitumen compound layer. The adhesion enhancer can include one or more of amine adhesion promoters, naphthenates, organosilanes-based adhesion promoters, etc.; however, other or additional adhesion enhancer can be used.

The fire retardant, when included in the bitumen compound layer, is about 0.05-30 wt. % (and all values and ranges therebetween) of the bitumen compound layer. In one non-limiting formulation, the fire retardant (when used) constitutes 0.05-25 wt. % of the bitumen compound layer. In another non-limiting formulation, the fire retardant (when used) constitutes 0.05-15 wt. % of the bitumen compound layer. In another non-limiting formulation, the fire retardant (when used) constitutes 0.05-10 wt. % of the bitumen compound layer. In another non-limiting formulation, the weight percent of fire retardant in the bitumen compound layer (when used) is less than the weight percent of the primary hydrocarbon compound in the bitumen compound layer. The fire retardant can include one or more of alumina trihydrate, ammonium polyphosphate, magnesium hydroxide, melamine, etc.; however, other or additional fire retardant can be used.

The tackifying agent, when included in the bitumen compound layer, is about 0.05-30 wt. % (and all values and ranges therebetween) of the bitumen compound layer. In one non-limiting formulation, the tackifying agent (when used) constitutes 0.05-5 wt. % of the bitumen compound layer. In another non-limiting formulation, the tackifying agent (when used) constitutes 0.05-2 wt. % of the bitumen compound layer. In another non-limiting formulation, the weight percent of tackifying agent in the bitumen compound layer (when used) is less than the weight percent of the primary hydrocarbon compound in the bitumen compound layer. The tackifying agent can include one or more of inorganic salt electrolytes and organic tackifiers, etc.; however, other or additional tackifying agent can be used.

The softening agent, when included in the bitumen compound layer, is about 0.05-30 wt. % (and all values and ranges therebetween) of the bitumen compound layer. In one non-limiting formulation, the softening agent (when used) constitutes 0.05-5 wt. % of the bitumen compound layer. In another non-limiting formulation, the softening agent (when used) constitutes 0.05-2 wt. % of the bitumen compound layer. In another non-limiting formulation, the weight percent of softening agent in the bitumen compound layer (when used) is less than the weight percent of the primary hydrocarbon compound in the bitumen compound layer.

The wax, when included in the bitumen compound layer, is about 0.05-15 wt. % (and all values and ranges therebetween) of the bitumen compound layer. In one non-limiting formulation, the wax (when used) constitutes 0.05-5 wt. % of the bitumen compound layer. In another non-limiting formulation, the wax (when used) constitutes 0.05-1 wt. % of the bitumen compound layer. In another non-limiting formulation, the weight percent of wax in the bitumen compound layer (when used) is less than the weight percent of the primary hydrocarbon compound in the bitumen compound layer. The wax can include paraffin wax, etc.; however, other or additional wax can be used.

The acid, when included in the bitumen compound layer, is about 0.05-15 wt. % (and all values and ranges therebetween) of the bitumen compound layer. In one non-limiting formulation, the acid (when used) constitutes 0.05-5 wt. % of the bitumen compound layer. In another non-limiting formulation, the acid (when used) constitutes 0.05-1 wt. % of the bitumen compound layer. In another non-limiting formulation, the weight percent of acid in the bitumen compound layer (when used) is less than the weight percent of the primary hydrocarbon compound in the bitumen compound layer. The acid can include stearic acid, etc.; however, other or additional acid can be used.

The reinforcement fibers, when included in the bitumen compound layer, are about 0.05-40 wt. % (and all values and ranges therebetween) of the bitumen compound layer. In one non-limiting formulation, the reinforcement fibers (when used) constitute 0.05-30 wt. % of the bitumen compound layer. In another non-limiting formulation, the reinforcement fibers (when used) constitute 0.05-25 wt. % of the bitumen compound layer. In another non-limiting formulation, the weight percent of reinforcement fibers in the bitumen compound layer (when used) is less than the weight percent of the primary hydrocarbon compound in the bitumen compound layer. The reinforcement fibers can include one or more of Kevlar®, carbon fibers, fiberglass, boron fibers, etc.; however, other or additional tackifier can be used.

In one non-limiting embodiment, the weight percent of the primary hydrocarbon compound in the bitumen compound layer is greater than the combined weight percent of filler, polymer modifier, hydrocarbon resin or process oil, tackifying agent, antioxidant, UV stabilizer, cross-linkers, biocide, coloring agent, metal flakes, adhesion enhancer, fire retardant, softening agent, wax, acid, and reinforcement fibers in the bitumen compound layer In another non-limiting embodiment, the weight percent of the primary hydrocarbon compound in the bitumen compound layer is greater than the combined weight percent of polymer modifier, hydrocarbon resin or process oil, tackifying agent, antioxidant, UV stabilizer, cross-linkers, biocide, coloring agent, metal flakes, adhesion enhancer, fire retardant, softening agent, wax, acid, and reinforcement fibers in the bitumen compound layer.

In another non-limiting embodiment, the weight percent of the primary hydrocarbon compound in the bitumen compound layer is greater than the combined weight percent of polymer modifier, hydrocarbon resin or process oil, tackifying agent, antioxidant, UV stabilizer, cross-linkers, biocide, coloring agent, adhesion enhancer, fire retardant, softening agent, wax, and acid in the bitumen compound layer.

In another non-limiting embodiment, the bitumen compound layer is partially or fully formed of a rubber-modified bitumen containing SBS, SEBS, SIS, or other rubber polymers known in the art. The bitumen compound layer can optionally contain fire retardants, and/or tackifier resins. The bitumen compound layer can optionally be surface-reinforced to add internal strength to the bitumen compound layer.

In another non-limiting embodiment, the bitumen compound layer can optionally include one or more internal reinforcement layers. Generally, when an internal reinforcement layer exists in the bitumen compound layer, only a single internal reinforcement layer is included in the bitumen compound layer. The type of internal reinforcement layer that can be used can include, but is not limited to, a mat, a sheet, or rows of rovings. The internal reinforcement layer can be formed of one or more of fiberglass, nylon, polyester, cotton, silk, wool, hemp, straw, bamboo, flax, jute, modal, asbestos fibers, basalt fibers, aramid fiber, acrylic fiber, polyurethane fiber, olefin fiber, rayon fiber, polylactide fiber, lurex fiber, carbon fibers, boron fibers, polyethylene fibers, aromatic polyamide or aramid fibers (e.g., Kevlar™, Twaron™, etc., and any blend of these materials. When an internal reinforcement layer is used, the internal reinforcement is partially or fully saturated/encapsulated with the bitumen compound layer. The internal reinforcement layer is generally a woven sheet; however, the internal reinforcement can be partially or fully formed of a non-woven material or rovings of fibers placed adjacent to one another. The internal reinforcement layer (when used) provides reinforcement and internal strength to the bitumen compound layer. The internal reinforcement layer (when used) is a flexible material that enables the bitumen compound layer to be rolled into a roll of bitumen compound layer which would otherwise cause damage to the bitumen compound layer. In one non-limiting configuration, the internal reinforcement layer can be rolled into a roll have a diameter of 8 inches or less without damaging the internal reinforcement layer. Generally, the internal reinforcement layer is located as a middle layer of the bitumen compound layer; however, this is not required. Generally, the internal reinforcement layer extends 80-100% (and all values and ranges therebetween) of the width of the bitumen compound layer, and 80-100% (and all values and ranges therebetween) of the length of the bitumen compound layer. In one non-limiting configuration, the internal reinforcement layer extends 95-100% of the width of the bitumen compound layer, and 95-100% of the length of the bitumen compound layer.

In another non-limiting embodiment, the thickness of each of the internal reinforcement layer inches is generally 2-150 mil (0.002-0.15 in.) (and all values and ranges therebetween). In one non-limiting arrangement, the thickness of each of the internal reinforcement layer inches is generally 2-50 mil. In another non-limiting arrangement, the thickness of each of the internal reinforcement layer, when used, is generally 5-30 mil. In another non-limiting arrangement, the thickness of each of the bitumen compound layer inches is generally 5-20 mil. In another non-limiting arrangement, the thickness of each of the bitumen compound layer inches is generally 5-15 mil. Generally, the thickness ratio of the bitumen compound layer to the internal reinforcement layer is 1.2:1 to 35:1 (and all values and ranges therebetween). In one non-limiting arrangement, the thickness ratio of the bitumen compound layer to the internal reinforcement layer is 2:1 to 26:1. In another non-limiting arrangement, the thickness ratio of the bitumen compound layer to the internal reinforcement layer is 4:1 to 20:1.

In another non-limiting embodiment, the thickness of the entire bitumen compound layer is generally 10-250 mil (0.01-0.25 in.) (and all values and ranges therebetween). In one non-limiting arrangement, the thickness of the entire bitumen compound layer is generally 20-150 mil. In another non-limiting arrangement, the thickness of the entire bitumen compound layer is generally 40-130 mil. In another non-limiting arrangement, the thickness of the entire bitumen compound layer is generally 80-100 mil.

In another non-limiting embodiment, the bitumen compound layer forms a waterproofing layer on the surface-reinforced bitumen roofing membrane.

Non-limiting examples of the composition of the bitumen compound layer (absent any optional internal reinforcement layer) are as follows:

Example 1

| | |
|---|---|
| Primary hydrocarbon compound | 25-90 wt. % |
| Filler | 0-66 wt. % |
| Polymer Modifier | 0-30 wt. % |

-continued

| | |
|---|---|
| Hydrocarbon Resin Process Oil | 0-30 wt. % |
| Antioxidant | 0-30 wt. % |
| UV Stabilizer | 0-30 wt. % |
| Cross-Linker | 0-30 wt. % |
| Biocide | 0-30 wt. % |
| Coloring Agent | 0-30 wt. % |
| Metal Flakes | 0-30 wt. % |
| Adhesion Enhancer | 0-30 wt. % |
| Fire Retardant | 0-30 wt. % |
| Tackifying Agent | 0-30 wt. % |
| Softening Agent | 0-30 wt. % |
| Wax | 0-15 wt. % |
| Acid | 0-15 wt. % |
| Internal Reinforcement Fiber | 0-40 wt. % |

Example 2

| | |
|---|---|
| Primary hydrocarbon compound | 25-80 wt. % |
| Filler (e.g., calcium carbonate, silica, talc, etc.) | 0.5-60 wt. % |
| Polymer Modifier (e.g., SBS, Polyurethane, etc.) | 0.05-25 wt. % |
| Hydrocarbon Resin Process Oil (e.g., naphthenic oil, paraffinic oil, etc.) | 0.05-20 wt. % |
| Antioxidant | 0-5 wt. % |
| UV Stabilizer | 0-5 wt. % |
| Cross-Linker | 0-10 wt. % |
| Biocide | 0-5 wt. % |
| Coloring Agent | 0-5 wt. % |
| Metal Flakes | 0-5 wt. % |
| Adhesion Enhancer | 0-5 wt. % |
| Fire Retardant | 0-25 wt. % |
| Tackifying Agent | 0-5 wt. % |
| Softening Agent | 0-5 wt. % |
| Wax | 0-5 wt. % |
| Acid | 0-5 wt. % |
| Internal Reinforcement Fiber (e.g., fiber, etc.) | 0-30 wt. % |

Example 3

| | |
|---|---|
| Primary hydrocarbon compound | 25-60 wt. % |
| Filler (e.g., calcium carbonate, silica, talc, etc.) | 0.5-50 wt. % |
| Polymer Modifier (e.g., SBS, Polyurethane, etc.) | 0.05-20 wt. % |
| Hydrocarbon Resin Process Oil (e.g., naphthenic oil, paraffinic oil, etc.) | 0.05-15 wt. % |
| Antioxidant | 0-2 wt. % |
| UV Stabilizer | 0-2 wt. % |
| Cross-Linker | 0-5 wt. % |
| Biocide | 0-2 wt. % |
| Coloring Agent | 0-2 wt. % |
| Metal Flakes | 0-2 wt. % |
| Adhesion Enhancer | 0-2 wt. % |
| Fire Retardant | 0-20 wt. % |
| Tackifying Agent | 0-2 wt. % |
| Softening Agent | 0-2 wt. % |
| Wax | 0-2 wt. % |
| Acid | 0-2 wt. % |
| Internal Reinforcement Fiber (e.g., fiber, etc.) | 0-25 wt. % |

Example 4

| | |
|---|---|
| Primary hydrocarbon compound | 25-55 wt. % |
| Filler (e.g., calcium carbonate, silica, talc, etc.) | 0.05-45 wt. % |
| Polymer Modifier (e.g., SBS, Polyurethane, etc.) | 0.05-10 wt. % |
| Hydrocarbon Resin Process Oil (e.g., naphthenic oil, paraffinic oil, etc.) | 0.05-5 wt. % |
| Antioxidant | 0-2 wt. % |
| UV Stabilizer | 0-2 wt. % |
| Cross-Linker | 0-5 wt. % |
| Biocide | 0-1 wt. % |
| Coloring Agent | 0-2 wt. % |
| Metal Flakes | 0-2 wt. % |
| Adhesion Enhancer | 0-2 wt. % |
| Fire Retardant | 0-15 wt. % |
| Tackifying Agent | 0-2 wt. % |
| Softening Agent | 0-2 wt. % |
| Wax | 0-2 wt. % |
| Acid | 0-2 wt. % |
| Internal Reinforcement Fiber (e.g., fiber, etc.) | 0-20 wt. % |

Example 5

| | |
|---|---|
| Primary hydrocarbon compound (e.g., 80-100 wt. % Bitumen) | 40-80 wt. |
| Filler (e.g., calcium carbonate, silica, talc, etc.) | 0-60 wt. % |
| Internal Reinforcement Fibers (e.g., fiberglass, etc.) | 0-30 wt. % |
| Polymer Modifier (e.g., SBS, Polyurethane, etc.) | 1-25 wt. % |
| Hydrocarbon Resin or Process Oil (e.g., naphthenic oil, paraffinic oil, etc.) | 0-15 wt. % |
| Antioxidant | 0-1 wt. % |
| UV Stabilizer | 0-1 wt. % |
| Biocide | 0-1 wt. % |
| Fire Retardant | 0-11 wt. % |

Example 6

| | |
|---|---|
| Primary hydrocarbon compound (e.g., 80-100 wt. % Bitumen) | 25-60 wt. % |
| Filler (e.g., calcium carbonate, silica, talc, etc.) | 25-60 wt. % |
| Internal Reinforcement Fibers (e.g., fiberglass, etc.) | 0-20 wt. % |
| Polymer Modifier (e.g., SBS, Polyurethane, etc.) | 2-20 wt. % |
| Hydrocarbon Resin or Process Oil (e.g., naphthenic oil, paraffinic oil, etc.) | 0-15 wt. % |
| Antioxidant | 0-1 wt. % |
| UV Stabilizer | 0-1 wt. % |
| Biocide | 0-1 wt. % |
| Fire Retardant (e.g., alumina trihydrate, ammonium polyphosphate, etc.) | 0.05-11 wt. % |

Example 7

| | |
|---|---|
| Primary hydrocarbon compound (e.g., 80-100 wt. % Bitumen) | 40-50 wt. % |
| Filler (e.g., calcium carbonate, silica, talc, etc.) | 35-50 wt. % |

-continued

| | |
|---|---|
| Internal Reinforcement Fibers (e.g., fiberglass, etc.) | 0-20 wt. % |
| Polymer Modifier (e.g., SBS, Polyurethane, etc.) | 4-8 wt. % |
| Hydrocarbon Resin or Process Oil (e.g., naphthenic oil, paraffinic oil, etc.) | 0-15 wt. % |
| Antioxidant | 0-1 wt. % |
| UV Stabilizer | 0-1 wt. % |
| Biocide | 0-1 wt. % |
| Fire Retardant (e.g., alumina trihydrate, ammonium polyphosphate, etc.) | 0.05-11 wt. % |

The Fiber Mat

The fiber mat is used as a surface reinforcement for the surface-reinforced bitumen roofing membrane. The fiber mat is applied on or above the top surface of the bitumen compound layer. As can be appreciated, multiple fiber mats can be used wherein one fiber mat is applied on or above a top surface of the bitumen compound layer, and a second fiber mat is applied on or below a bottom surface of the bitumen compound layer.

When the bitumen compound layer includes the optional internal reinforcement layer, the fiber mat and the optional internal reinforcement layer are generally spaced from one another. When the bitumen compound layer includes the optional internal reinforcement layer, the fiber mat generally has a greater thickness than the thickness of the optional internal reinforcement layer; however, this is not required. The composition of the fiber mat and the optional internal reinforcement layer can be the same or different.

One non-limiting purpose of the fiber mat is to act as a reinforcement layer for an optional applied liquid coating on the surface-reinforced bitumen roofing membrane. Another non-limiting optional purpose of the fiber mat is to strengthen the surface-reinforced bitumen roofing membrane. When a liquid coating is applied to the surface of the fiber mat, such coating can be pre-applied to the surface-reinforced bitumen roofing membrane, or be applied in the field prior to or after the surface-reinforced bitumen roofing membrane is placed on a roof system or siding system of a building or other type of structure.

The fiber mat generally covers or spans 50-100% (and all values and ranges therebetween) of the width of the surface-reinforced bitumen roofing membrane, and also generally covers or spans 50-100% (and all values and ranges therebetween) of the longitudinal length of the surface-reinforced bitumen roofing membrane. In one non-limiting embodiment, the fiber mat generally covers or spans 75-100% of the width of the surface-reinforced bitumen roofing membrane, and also generally covers or spans 75-100% of the longitudinal length of the surface-reinforced bitumen roofing membrane. In one non-limiting specific configuration, the fiber mat generally covers or spans 95-100% of the width of the surface-reinforced bitumen roofing membrane, and also generally covers or spans 95-100% of the longitudinal length of the surface-reinforced bitumen roofing membrane. In another non-limiting specific configuration, the fiber mat generally covers or spans 75-90% of the width of the surface-reinforced bitumen roofing membrane, and/or generally covers or spans 75-90% of the longitudinal length of the surface-reinforced bitumen roofing membrane. The region of the surface-reinforced bitumen roofing membrane that is absent the fiber mat can form a lap line region. The width of the lap line region (when used) is generally 0.5-6 in. (and all values and ranges therebetween), typically the width of the lap line region is 1-5 in., and more typically, the width of the lap line region is 3-4 in. In another non-limiting embodiment, the fiber mat can be made wide enough to span 50-100% of the longitudinal length of the surface-reinforced bitumen roofing membrane and overhang one edge of the surface-reinforced bitumen roofing membrane to form a ready-made lap that ties into the adjacent membrane. This overhanging edge can have a length or width of 0.5-10 in. (and all values and ranges therebetween).

When the fiber mat generally covers or spans 75-90% of the width of the surface-reinforced bitumen roofing membrane, the region of the surface-reinforced bitumen roofing membrane that is absent the fiber mat (e.g., lap line region) can optionally include a release material (e.g., polymeric liner, paper liner, etc.). Such release material can be of similar composition and thickness as the optional release liner that can be included in the bottom surface of the surface-reinforced bitumen roofing membrane as discussed below, or can be of similar composition and thickness as the optional release film that can be included on the top surface of the fiber mat as discussed below.

When the fiber mat generally covers or spans 75-90% of the width of the surface-reinforced bitumen roofing membrane, the region of the surface-reinforced bitumen roofing membrane that is absent the fiber mat (e.g., lap line region) can be the top surface of the bitumen compound layer; however, this is not required.

The fiber mat may be a woven mat, a non-woven mat, a mat formed by non-overlapping fibers (e.g., rovings, etc.), or a mat formed by overlapping fibers. In one non-limiting embodiment, the fiber mat is a woven mat. In one non-limiting configuration, the fiber material used to at least partially form the fiber mat is partially or fully formed of fibers that are 0.2-20 in. in length (and all values and ranges therebetween) and are partially or fully held together by a binder (e.g., polymeric binder, etc.), and typically the fiber mat is partially or fully formed of fibers that are 0.3-5 inches in length and are partially or fully held together by a binder. In one non-limiting arrangement, the fiber mat is formed of a plurality of fibers that are oriented in multiple directions from one another (e.g., multi-directional fiber mat) and such fibers are bonded together by a polymeric binder material (e.g., acrylic binder, etc.) and the length of the fibers is 0.1-5 in. In another non-limiting arrangement, the fiber mat is formed of a plurality of fibers that are woven together and such fibers are optionally bonded together by a polymeric binder material (e.g., acrylic binder, etc.) and the length of the fibers is 2-10 in.

The fiber mat is generally flexible and/or rollable. In one non-limiting configuration, the fiber mat can be rolled into a roll have a diameter of 8 inches or less without damaging the fiber mat.

The fiber mat generally has an average thickness of at least 2 mil (0.002 in.) and typically has an average thickness than is up to 160 mil (0.16 in.) (and all values and ranges therebetween). In one non-limiting configuration, the fiber mat has an average thickness of 2-60 mil. In another non-limiting configuration, the fiber mat has an average thickness of 2-40 mil. In another non-limiting configuration, the fiber mat has an average thickness of 10-20 mil. Generally, the thickness ratio of the bitumen compound layer to the fiber mat is 1.3:1 to 33:1 (and all values and ranges therebetween). In one non-limiting arrangement, the thickness ratio of the bitumen compound layer to the fiber mat is 2:1 to 25:1. In another non-limiting arrangement, the thickness ratio of the bitumen compound layer to the fiber mat is 4:1 to 18:1.

The fiber mat is formed from one or more materials (e.g., fiberglass, nylon, polyester, cotton, silk, wool, hemp, straw, bamboo, flax, jute, modal, asbestos fibers, basalt fibers, aramid fiber, acrylic fiber, polyurethane fiber, olefin fiber, rayon fiber, polylactide fiber, lurex fiber, carbon fibers, boron fibers, polyethylene fibers, aromatic polyamide or aramid fibers (e.g., Kevlar™, Twaron™, etc., and any blend of these materials). In one non-limiting embodiment, the fiber mat is formed of or includes fiberglass fibers.

The fiber mat can be optionally formed, treated, etc., to be wick resistant to inhibit or prevent moisture from moving through the fiber mat and contacting one or more layers under the fiber mat. As such, the fibers of the mat can be a) formed of a wick-resistant material; b) the knitting together of the fibers can be tight to inhibit or resist moisture penetration or wicking of moisture through the fabric layer; and/or c) the fibers and/or the fiber mat itself can be coated with a material that inhibits or resists moisture penetration or wicking of moisture through the fabric layer.

The fiber mat can optionally have fire-retardant properties. In non-limiting configuration, the fiber mat can optionally be pre-treated and/or post-treated with one or more fire-retardant materials (e.g., halogenated compound containing coatings, expandable graphite containing coatings, etc.).

The fiber mat can optionally include a backing material. The backing material (when used) can be pre-coated on the bottom surface of the fiber mat. The backing material can be formed of a material that facilities in the securing of the fiber mat to a) the top surface of the bitumen compound layer; or b) the top surface of an optional bleed blocker layer or layer. In one non-limiting embodiment, the backing material is formed of a bitumen- or asphalt-containing material, a polymeric coating layer, or a polymeric sheet layer. In one non-limiting configuration, the composition of the backing material is different from a) the composition of the bitumen composition in the bitumen compound layer; and/or b) the composition of the optional bleed blocker layer. The thickness of the backing material (when used) is generally at least 0.1 mil (0.0001 in.) and generally no more than 40 mils (0.04 in.) and all values and ranges therebetween).

The fiber mat generally has a different composition and/or configuration from the optional internal reinforcement used in the bitumen compound layer. In one non-limiting embodiment, the fiber mat has a different composition from the optional internal reinforcement used in the bitumen compound layer, and also optionally has a different fiber orientation from the fibers used in the internal reinforcement of the bitumen compound layer.

In one non-limiting embodiment, the surface of the fiber mat can optionally have a surface protective film to make it weather resistant until the coating is applied; however, this is not necessary. The protective film can be permanently coated onto the surface of the fiber mat and/or be in the form of a release film that is releasably connected to the top surface of the fiber mat. The surface protective film can be used to inhibit or prevent moisture from wicking or otherwise penetrating the fiber mat and allowing moisture to contact one or more layers under the fiber mat. When the surface protective film is in the form of a release film, the release film can have a thickness of 0.2-50 mil (and all values and ranges therebetween). In one non-limiting configuration, the thickness of the release film, when used, is 1-10 mil.

The release film (when used) can optionally be treated with silicone. The release film (when used) can optionally include a pressure sensitive adhesive that is configured to releasably connect to the top surface of the fiber mat. The release film (when used) can be formed of a paper (e.g. kraft paper, super calendared kraft paper, clay coated kraft paper, polymer coated kraft paper, glazed paper, etc.) or a polymeric film (e.g., PET film, polypropylene film, polyolefins film, polyethylene films, PP films, etc.) or a paper that is coated with a polymeric film.

The Release Liner or Underside Material

A release liner can be optionally applied to the bottom surface of the bitumen compound layer or form the bottom surface of the surface-reinforced bitumen roofing membrane. Such release liner can be formed of a paper (e.g. kraft paper, super calendared kraft paper, clay coated kraft paper, polymer coated kraft paper, glazed paper, etc.) or a polymeric film (e.g., PET film, polypropylene film, polyolefins film, polyethylene films, PP films, etc.) or a paper that is coated with a polymeric film. The thickness of the release liner is generally 0.2-50 mil (and all values and ranges therebetween). In one non-limiting configuration, the thickness of the release liner (when used) is 1-10 mil.

As can be appreciated, the bottom surface of the bitumen compound layer or the bottom surface of the surface-reinforced bitumen roofing membrane can be absent a release liner. The bottom surface of the bitumen compound layer or the bottom surface of the surface-reinforced bitumen roofing membrane can include a material other than a release liner, such as a ground glass layer, a sand layer, and/or a fire-resistant layer on the bottom surface of the bitumen compound layer or the bottom surface of the surface-reinforced bitumen roofing membrane.

The Bleed Blocker Layer

A bleed blocker layer can optionally be included in the surface-reinforced bitumen roofing membrane and (when used) such bleed blocker layer is located between the fiber mat and the bitumen compound layer. The bleed blocker layer is configured to form a barrier between the fiber mat and the bitumen compound layer. Such barrier is used to a) inhibit or prevent the bitumen oils in the bitumen compound layer from bleeding through the fiber mat; b) discoloring a liquid applied coating that has been applied to the top surface of the fiber mat; c) provide improved fire retardancy of the surface-reinforced bitumen roofing membrane; d) provide improved strength to the surface-reinforced bitumen roofing membrane; e) inhibit or prevent blistering or other deleterious effects to the liquid applied coating on the fiber mat; and/or f) provide weathering properties to the surface-reinforced bitumen roofing membrane. The bleed blocker layer is generally in the form of a layer that is applied in liquid form to a top surface of the bitumen compound layer and thereafter dries and/or cures on the top surface of the top surface of the bitumen compound layer. As can be appreciated, the bleed blocker layer can be a preformed polymeric film that is applied to the top surface of the bitumen compound layer.

The thickness of the bleed blocker layer (when used), is generally at least 0.1 mil and typically no more than 40 mil (and all values and ranges therebetween). In one non-limiting configuration, the thickness of the bleed blocker layer is 1-15 mil. In one non-limiting configuration, the thickness of the bleed blocker layer is 3-8 mil.

When the bleed blocker layer is applied as a liquid coated layer, the bleed blocker layer can be spray coated or roll coated on the underside surface of the bitumen compound layer, but it is not limited to these application methods. As can be appreciated, any application method available in the art can be used to deposit a liquid coating of bleed blocker layer.

The composition of the bleed blocker layer includes one or more of acrylic coating, polyvinyl alcohol coating, nitrile rubber coating, thermoplastic urethane coating, polyamide coating, vinyl acetate coating, latex coating, SBR coating, SBS coating, SEBS coating, SIS coating, natural or synthetic rubber coating, low density polyethylene (LDPE) coating, linear low density polyethylene (LLDPE) coating, medium density polyethylene (MDPE) coating, high density polyethylene (HDPE) coating, cast unrented polypropylene (CPP) coating, biaxially oriented polypropylene (BOPP) coating, polyethylene/polyamide (PE/PA) coating, polyester coating, polyethylene terephthalate coating, polyurethane coating, polyamide coating, silicone coating, polyurethane coating, poly(methyl methacrylate) coating, or some type of elastomeric coating.

The bleed blocker layer can optionally be formed of one or more polymeric single ply sheets (e.g., TPO (thermoplastic olefin or thermoplastic polyolefin), EPDM (ethylene propylene diene monomer), PVC (polyvinyl chloride), CSPE (chlorosulfonated polyethylene), EPM (ethylene propylene monomer), KEE (ketone ethylene ester), etc.).

The Liquid Applied Coating

The surface-reinforced bitumen roofing membrane can optionally include a pre-applied liquid applied coating that is applied to the fiber mat. Alternatively, a liquid applied coating can be applied to the fiber mat after the surface-reinforced bitumen roofing membrane has been installed on a building structure (e.g., roof of a building, etc.). The liquid applied coating is used to partially or fully saturate and/or encapsulate the fiber mat. The viscosity of the liquid applied coating is non-limiting. The liquid applied coating can have a viscosity such that the liquid applied coating can be sprayed, rolled, brushed, or mopped onto the fiber mat. Alternatively, the liquid applied coating can have a viscosity such that the liquid applied coating is gel or paste-like. The liquid applied coating can be applied to the fiber mat by spraying, rolling, brushing, mopping, applying, and pressing, etc., the liquid applied coating on the fiber mat.

The composition of the liquid applied coating can be partially or fully formed of polyurethane, polyurea, poly(methyl methacrylate), an elastomeric, and/or silicone. The composition of the liquid applied coating is typically different from the composition of the bitumen composition of the bitumen compound layer. The composition of the liquid applied coating is also typically different from the composition of the bleed blocker layer (when used); however, this is not required.

When the liquid applied coating is applied to the fiber mat after the surface-reinforced bitumen roofing membrane has been installed on a building structure, the dried liquid applied coating will have a coating thickness on the top surface of the fiber mat of at least 0.5 mil. In one non-limiting configuration, the dried liquid applied coating will have a coating thickness on the top surface of the fiber mat of 0.5-250 mil (and all values and ranges therebetween). In another non-limiting configuration, the dried liquid applied coating will have a coating thickness on the top surface of the fiber mat of 0.5-50 mil.

The thickness of the wet liquid applied coating when initially applied to the top surface of the fiber mat is generally at least 1 mils (e.g., about 0.0625 gal./100 sf) and can be up to about 250 mils (about 15 gal./100 sf) (and all values and ranges therebetween). In one non-limiting method, when the liquid applied coating is applied to the fiber mat after the surface-reinforced bitumen roofing membrane has been installed on a building structure, the liquid applied coating is applied at a wet thickness of about 1-100 mil to form a dried coating thickness of the liquid applied coating on the top surface of the fiber mat of 0.5-80 mil.

When the liquid applied coating is pre-applied to the fiber mat prior to the surface-reinforced bitumen roofing membrane being installed on a building structure, the liquid applied coating can be pre-applied to the fiber mat prior to the fiber mat be secured to the bleed blocker layer or the bitumen compound layer; however, it can be appreciated that the liquid applied coating can be applied to the fiber mat after the fiber mat has been applied and/or secured to the bleed blocker layer or the bitumen compound layer.

It is one non-limiting object of the disclosure to provide a contractor with a ready-made reinforcement layer for a field-applied liquid applied coating.

In another and/or alternative non-limiting object, there is provided a surface-reinforced bitumen roofing membrane that includes a surface reinforcement layer that optionally comprises a multi-directional strand fiber mat.

In another and/or alternative non-limiting object, there is provided a surface-reinforced modified bitumen roofing membrane that includes a surface reinforcement layer that comprises multi-directional strand fiber mat that optionally includes a liquid applied coating that partially or fully encapsulates the surface reinforcement layer.

In another and/or alternative non-limiting object, there is provided a surface-reinforced bitumen roofing membrane that includes at least two layers, namely 1) a bitumen compound layer, and 2) a fiber mat, and can optionally include a) an optional bleed blocker layer that is located between the bitumen compound layer and the fiber mat, b) an optional liquid applied coating that partially or fully encapsulates the fiber mat, c) an optional release liner that is releasably positioned on the bottom surface of the bitumen roofing membrane, and/or d) an optional release film that is releasably positioned on the fiber mat surface or the optional liquid applied coating on the fiber mat.

In another and/or alternative non-limiting object, there is provided a surface-reinforced bitumen roofing membrane that includes bitumen compound layer that comprises a primary hydrocarbon compound; and optionally one or more of a) filler, b) polymer modifier, c) hydrocarbon resin or process oil, d) tackifying agent, e) antioxidant, f) UV stabilizer, g) cross-linkers, h) biocide, i) coloring agent, j) metal flakes, k) adhesion enhancer, l) fire retardant, m) softening agent, n) wax, o) acid, and/or p) reinforcement fibers.

In another and/or alternative non-limiting object, there is provided a surface-reinforced bitumen roofing membrane that includes a bitumen compound layer that is partially or fully formed of a rubber-modified bitumen.

In another and/or alternative non-limiting object, there is provided a surface-reinforced bitumen roofing membrane that includes a bitumen compound layer that comprises a base sheet.

In another and/or alternative non-limiting object, there is provided a surface-reinforced bitumen roofing membrane that includes a bitumen compound layer that forms a waterproofing layer.

In another and/or alternative non-limiting object, there is provided a surface-reinforced bitumen roofing membrane that includes a fiber mat that is used as a surface reinforcement for the surface-reinforced bitumen roofing membrane.

In another and/or alternative non-limiting object, there is provided a surface-reinforced bitumen roofing membrane that includes a fiber mat that is used to strengthen the surface-reinforced bitumen roofing membrane and/or to act as a reinforcement layer for an optional applied liquid applied coating on the top surface of the fiber mat.

In another and/or alternative non-limiting object, there is provided a surface-reinforced bitumen roofing membrane that includes a fiber mat that only covers a portion of the top surface of the layer of the surface-reinforced bitumen roofing membrane on which the fiber mat lies to form a lap line region on one or more portions about the perimeter of the surface-reinforced bitumen roofing membrane.

In another and/or alternative non-limiting object, there is provided a surface-reinforced bitumen roofing membrane that includes a lap line region that is covered with a release material.

In another and/or alternative non-limiting object, there is provided a surface-reinforced bitumen roofing membrane that includes a fiber mat that is a woven mat, a non-woven mat, a mat formed by non-overlapping fibers, or a mat formed by overlapping fibers.

In another and/or alternative non-limiting object, there is provided a surface-reinforced bitumen roofing membrane that includes a fiber mat that is partially or fully formed of fibers that are partially or fully held together by a binder.

In another and/or alternative non-limiting object, there is provided a surface-reinforced bitumen roofing membrane that includes a fiber mat that is formed of a plurality of fibers that are oriented in multiple directions from one another (e.g., multi-directional fiber mat) and such fibers are bonded together by a polymeric binder material.

In another and/or alternative non-limiting object, there is provided a surface-reinforced bitumen roofing membrane that includes a fiber mat having fire-retardant properties.

In another and/or alternative non-limiting object, there is provided a surface-reinforced bitumen roofing membrane that includes a fiber mat that includes a backing material.

In another and/or alternative non-limiting object, there is provided a surface-reinforced bitumen roofing membrane that includes a release liner applied to the bottom surface of the bitumen compound layer or bottom surface of the surface-reinforced bitumen roofing membrane.

In another and/or alternative non-limiting object, there is provided a surface-reinforced bitumen roofing membrane wherein the bottom surface of the bitumen compound layer includes a ground glass layer, a sand layer, or fire-resistant layer.

In another and/or alternative non-limiting object, there is provided a surface-reinforced bitumen roofing membrane that includes a bleed blocker layer located between the fiber mat and the bitumen compound layer.

In another and/or alternative non-limiting object, there is provided a surface-reinforced bitumen roofing membrane that includes a bleed blocker layer that is configured to form a barrier between the fiber mat and the bitumen compound layer used to a) inhibit or prevent the bitumen oils in the bitumen compound layer from bleeding through the fiber mat and discoloring a liquid applied coating that has been applied to the top surface of the fiber mat, b) provide improved fire retardancy of the surface-reinforced bitumen roofing membrane, c) provide improved strength to the surface-reinforced bitumen roofing membrane, d) blistering or other deleterious effects to the liquid applied coating, and/or e) provide weathering properties to the surface-reinforced bitumen roofing membrane.

In another and/or alternative non-limiting object, there is provided a surface-reinforced bitumen roofing membrane that includes a pre-applied or post-applied liquid applied coating that is applied to the fiber mat.

In another and/or alternative non-limiting object, there is provided a surface-reinforced bitumen roofing membrane that includes a pre-applied or post-applied liquid applied coating used to partially or fully saturate and/or encapsulate the fiber mat.

In another and/or alternative non-limiting object, there is provided a surface-reinforced bitumen roofing membrane that includes a pre-applied or post-applied liquid applied coating that has a composition that is different from the bitumen composition of the bitumen compound layer and/or the composition of the bleed blocker layer (when used).

In another and/or alternative non-limiting object, there is provided a surface-reinforced bitumen roofing membrane that has a coating applied to the fiber mat, and which coating does not contact the bitumen compound layer.

In another and/or alternative non-limiting object, there is provided a surface-reinforced bitumen roofing membrane that enables an installer to eliminate the need for embedding a loose fabric reinforcement, thus removing a step of applying a base coat of liquid applied coating, then manually rolling out and positioning a fabric reinforcement that could wrinkle or tent and later result in delamination, blister, form a surface defect, or create a roof failure.

In another and/or alternative non-limiting object, there is provided a surface-reinforced bitumen roofing membrane that forms a lighter roof than a traditional multilayered roof system containing a base sheet and cap sheet because the liquid applied coating becomes the monolithic cap sheet.

Other objects, advantages, and novel features of the present invention will become apparent from the following detailed description of the invention when considered in conjunction with the accompanying drawings.

BRIEF DESCRIPTION OF THE DRAWINGS

The following is a brief description of the drawings, which are presented for the purposes of illustrating the exemplary objects disclosed herein and not for the purposes of limiting the same.

DETAILED DESCRIPTION OF VARIOUS NON-EMBODIMENTS OF DISCLOSURE

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Referring now to the drawings which illustrate non-limiting embodiments of the surface-reinforced bitumen roofing membrane in accordance with the present disclosure, FIGS. 1-4 illustrate various non-limiting embodiments of the surface-reinforced bitumen roofing membrane and a non-limiting process for forming the surface-reinforced bitumen roofing membrane in accordance with the present disclosure.

The surface-reinforced bitumen roofing membrane includes at least two layers, namely 1) a bitumen compound layer, and 2) a fiber mat, and can optionally include a) an optional bleed blocker layer that is located between the bitumen compound layer and the fiber mat, b) an optional liquid applied coating that partially or fully encapsulates the fiber mat, c) an optional release liner that is releasably positioned on the bottom surface of the bitumen roofing membrane, and/or d) an optional release film that is releasably positioned on the fiber mat surface or the optional liquid applied coating.

The surface-reinforced bitumen roofing membrane in accordance with the disclosure provides a user (e.g., contractor, etc.) with a ready-made reinforcement layer for a field-applied liquid applied coating; however, the coating applied on the surface-reinforced bitumen roofing membrane at time of manufacture in an in-line process.

The bitumen compound layer can include a rubber-modified bitumen containing SBS, SEBS, SIS, or other rubber polymers. The bitumen compound layer can optionally contain fire retardants and tackifier resins.

The bitumen compound layer optionally includes an internal reinforcement to add reinforcement and internal strength to the bitumen compound layer when the bitumen compound layer is in the rolled or unrolled state. The type of internal reinforcement that can be used in the bitumen compound layer can include, but is not limited to, a polyester reinforcement, a glass fiber reinforcement, and/or a combination of polyester and glass fiber reinforcement. The internal reinforcement (e.g., polyester, fiberglass mat, or combination thereof) is generally different from the fiber mat) and generally has a thickness of 5-20 mil.

The bottom surface of the bitumen compound layer can be formulated to be a self-adhering surface. When the bottom surface of the bitumen compound layer is formulated to be a self-adhering surface, the bottom surface of the bitumen compound layer can include a release liner. The release liner can have a thickness of 1-10 mil, and which release liner can be optionally treated with a polymer (e.g., silicone, etc.). As can be appreciated, a release liner is not necessary with a bitumen compound layer that is not self-adhering, such as a bitumen compound layer that as a bottom surface that includes ground glass, sand, a burn backer, etc.

The top of surface of the fiber mat can include an optional removable surface protective film or release film to protect the membrane surface from water until the coating system can be applied. The release film can have a thickness of 1-20 mil, and which release film can be optionally treated with a polymer (e.g., silicone, etc.) on one or both sides. In a non-limiting embodiment, the release film can be treated with a pressure sensitive adhesive on the side in contact with the fiber mat or the liquid applied coating to keep the release film more secure yet able to be peeled from the fiber mat or liquid applied coating with little or no damage to the fiber mat.

The surface-reinforced bitumen roofing membrane includes a bitumen compound layer formed of a modified bitumen compound. One non-limiting formulation for the bitumen compound layer includes:

| | |
|---|---|
| Primary hydrocarbon compound (e.g., 80-100 wt. % bitumen) | 25-60 wt. % |
| SBS Rubber | 2-20 wt. % |
| Filler (e.g., calcium carbonate) | 25-60 wt. % |

| | |
|---|---|
| Fire Retardants (e.g., alumina trihydrate, and charring agents such as ammonium polyphosphate) | 0.01-11 wt. % |
| Hydrocarbon Resin or processing oil | 1-10 wt. %. |

The fiber mat that is applied to the bitumen compound layer at least partially functions as a surface reinforcement for the surface-reinforced bitumen roofing membrane. The fiber mat can also be used to form a surface reinforcement layer that includes the liquid applied coating that is applied to the fiber mat. In one non-limiting configuration, the fiber mat is formed of multi-directional fibers (e.g., strands of fire retardant fiberglass, etc.) that are held together with a binder (e.g., acrylic binder, etc.). The fiber mat generally has a thickness of 10-20 mil and the length of the fibers in the fiber mat are generally 1/32-5 in. long.

The fiber mat can optionally include a backing material that is pre-coated on the bottom surface of the fiber mat. The composition of the optional backing material can be bitumen or asphalt, plastic, or other polymer to facilitate in adhering the fiber mat to the bitumen compound layer or the optional bleed blocker layer.

The fiber mat generally spans the entire width of the surface-reinforced bitumen roofing membrane. However, the fiber mat can be configured to span less than the full width of the surface-reinforced bitumen roofing membrane to form a lap line region on one or both sides of the surface-reinforced bitumen roofing membrane along the longitudinal length of the surface-reinforced bitumen roofing membrane. The top surface of the one or more lap line regions optionally can be formed of bitumen, rubber-modified bitumen, or the composition of the top surface of the bitumen compound layer. The width of the lap line region (when formed) is generally 1-5 in., and typically 3-4 in. The top surface of the lap line region can include a release liner.

Alternatively, the fiber mat can optionally be made to overhang one (or both) longitudinal edges of the bitumen compound layer to provide a lap reinforcement, or tie in, to an adjacent surface-reinforced bitumen roofing membrane.

The fiber mat can optionally have fire-retardant properties. As such, the fiber mat can be optionally pretreated and/or post-treated with fire-retardant materials (e.g., applied halogenated compounds, graphite compounds, etc.).

An adhesive can optionally be used to secure the fiber mat to the bitumen compound layer or optional bleed blocker layer.

The surface-reinforced bitumen roofing membrane can optionally include a liquid applied coating that partially or fully encapsulates the fiber mat. Such liquid applied coating can be a pre-applied coating or a coating that is applied after the surface-reinforced bitumen roofing membrane has been placed on a building structure (e.g., roof, etc.). The liquid applied coating is used to partially or fully saturate and/or encapsulate the fiber mat. In one method, the liquid applied coating is coated by a contractor in the field after the installation of the surface-reinforced bitumen roofing membrane on a roof system. The liquid applied coating can be applied in the field to the surface-reinforced bitumen roofing membrane by spray coating, mopping, rolling, brushing, etc. the liquid applied coating onto the top surface of the fiber mat.

The optional liquid applied coating is formulated to partially or fully penetrate the fiber mat (e.g., fiberglass mat, etc.). Generally, the liquid applied coating does not a) come into direct contact with the top surface of the bitumen compound layer, or b) does not substantially come into direct contact with the top surface of the bitumen compound layer (e.g., 0-10% and all values and ranges therebetween of the top surface of the bitumen compound layer comes in direct contact with the liquid applied coating) due to the properties of the fiber mat and/or optional bleed blocker layer. The limiting or prevention of the liquid applied coating from contacting the bitumen compound layer results in the limiting or prevention of oils from the bitumen compound layer from diffusing into the liquid applied coating which can result in discoloration of the top surface of the liquid applied coating, blistering in the liquid applied coating, and/or other deleterious effects to the liquid applied coating.

The liquid applied coating can be formed of polyurethane, polyurea, poly(methyl methacrylate), an elastomeric material, and/or silicone.

The dried thickness of the liquid applied coating on the fiber mat is generally 4-6 mil. Generally, the wet thickness of the liquid applied coating can be 64-100 mil.

The liquid applied coating can be pre-applied to the surface-reinforced bitumen roofing membrane by 1) applying the liquid applied coating to the fiber mat after the fiber mat is connected to the bitumen compound layer or optional bleed blocker layer, or 2) applying the liquid applied coating to the fiber mat prior to the fiber mat being connected to the bitumen compound layer or optional bleed blocker layer.

The final thickness of the surface-reinforced bitumen roofing membrane is generally 20-150 mil, typically 40-130 mil, and more typically 80-100 mil.

The surface-reinforced bitumen roofing membrane in accordance with the disclosure removes a step of applying a liquid applied coating on a roof membrane, and then manually rolling out and positioning a fabric reinforcement on the base coat that can wrinkle or tent or later delaminate, blister, or result in a surface defect or surface failure. The resulting roof that uses the surface-reinforced bitumen roofing membrane in accordance with the disclosure can be lighter than a traditional multi-layered roof system containing a base sheet and cap sheet because the liquid applied coating becomes the monolithic cap sheet on the surface-reinforced bitumen roofing membrane in accordance with the disclosure, thus eliminating additional layers as used in traditional roofing systems.

The surface-reinforced bitumen roofing membrane can optionally include a bleed blocker layer that is located between the bitumen compound layer and the fiber mat. The bleed blocker layer is used to provide a barrier between the fiber mat and the bitumen compound layer to inhibit or prevent the bitumen oils from bleeding through the fiber mat and interacting with the liquid applied coating that is applied to the top surface of the fiber mat. The bleed blocker layer can also be used to improve the fire retardancy of the surface-reinforced bitumen roofing membrane. The bleed blocker layer can also be used to improve the weathering properties of the surface-reinforced bitumen roofing membrane. The bleed blocker layer can be formed of an acrylic material, polyvinyl alcohol, nitrile rubber, thermoplastic urethane, polyamide, vinyl acetate, latex, SBR, SBS, SEBS, SIS, natural rubber, low density polyethylene (LDPE), linear low density polyethylene (LLDPE), medium density polyethylene (MDPE), high density polyethylene (HDPE), cast unrented polypropylene (CPP), biaxially oriented polypropylene (BOPP), polyethylene/polyamide (PE/PA), polyester, polyethylene terephthalate, polyurethane, and/or polyamide. The bleed blocker layer can be applied as a liquid coating to the bottom surface of the fiber mat and/or to the top surface of the bitumen compound layer. Alternatively, the bleed blocker layer can be a preformed film (e.g., single ply film, multi-ply film, etc.) that is connected to the bottom surface of the fiber mat and/or to the top surface of the bitumen compound layer. An adhesive can optionally be used to secure the bleed blocker layer to the bottom surface of the fiber mat and/or to the top surface of the bitumen compound layer. In another non-limiting arrangement, the bleed blocker layer can include a fiber surface-reinforced layer (e.g., fiberglass woven or non-woven mat) that is coated with a polymer, or otherwise chemically treated.

FIGS. 1-4 illustrate three non-limiting embodiments of the surface-reinforced bitumen roofing membrane in accordance with the present disclosure.

Figure 1:
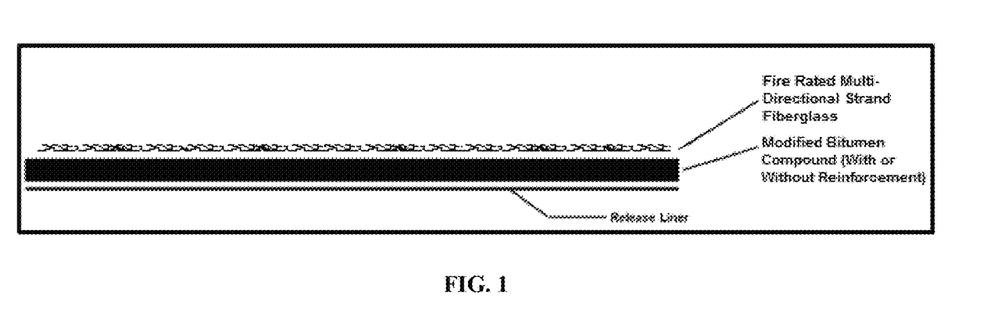
FIG. 1 illustrates the use of the surface-reinforced bitumen roofing membrane without a polymeric bleed blocker and also illustrates the optional temporary surface film that can be used to protect the membrane from water.

FIG. 1 illustrates the surface-reinforced bitumen roofing membrane formed by a fiber mat that is connected to a bitumen compound layer, which bitumen compound layer optionally includes a release liner that is releasably connected to a bottom surface of the bitumen compound layer. The fiber mat can be formed of multi-directional fibers that are secured together by a binder. The bitumen compound layer may or may not include a reinforcement layer. The fibers in the fiber mat are optionally formed of fiberglass, and the fiber mat is optionally treated with a fire retardant. The surface-reinforced bitumen roofing membrane also optionally includes a removable release film that is releasably connected to the top mat to protect the membrane against water until the coating can be applied.

FIG. 1 also illustrates that the fiber mat does not extend the full width of the bitumen compound layer to create an optional lap line region on one or both sides of the surface-reinforced bitumen roofing membrane. Although not shown, the lap line region can optionally include a release liner.

Figure 2:
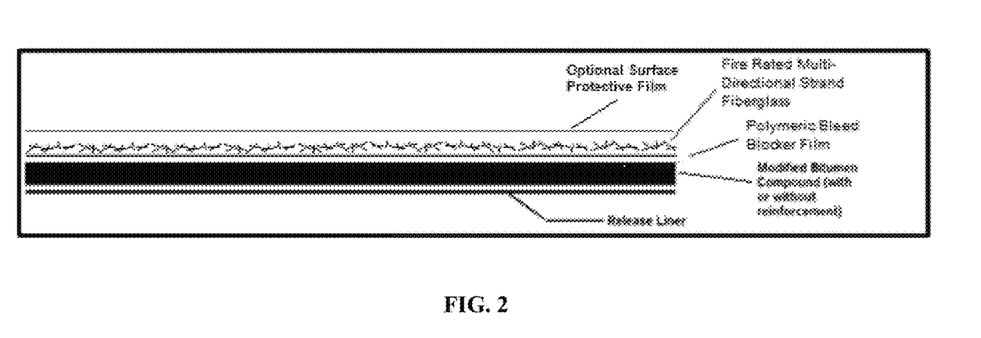
FIG. 2 illustrates the use of the surface-reinforced bitumen roofing membrane with a fiber mat and a polymeric bleed blocker, and also illustrates the optional temporary surface film that can be used to protect the membrane from water.

FIG. 2 illustrates the surface-reinforced bitumen roofing membrane formed by a fiber mat that is connected to a bleed blocker layer, which bleed blocker layer is connected to the bitumen compound layer, which bitumen compound layer optionally includes a release liner that is releasably connected to a bottom surface of the bitumen compound layer. The fiber mat is formed of multi-directional fibers that are secured together by a binder. The bitumen compound layer may or may not include a reinforcement layer. The fibers in the fiber mat are optionally formed of fiberglass, and the fiber mat is optionally treated with a fire retardant. The surface-reinforced bitumen roofing membrane also optionally includes a removable release film that is releasably connected to the top mat to protect the membrane against water until the coating can be applied.

As can be appreciated, the fiber mat illustrated in FIG. 2 does not need to extend the full width of the bitumen compound layer, thus can only partially extend the full width of the bitumen compound layer as illustrated in FIG. 1 to create a lap line region on one or both sides of the surface-reinforced bitumen roofing membrane, thereby exposing a top surface of the bleed blocker layer. In such an optional arrangement, the lap line region can optionally include a release liner.

Figure 3:
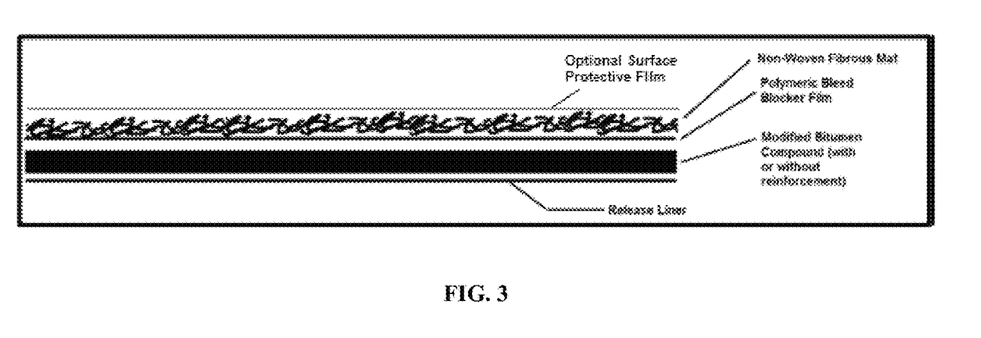
FIG. 3 illustrates the surface-reinforced bitumen roofing membrane having a non-woven fibrous mat and polymeric bleed blocker, and also illustrates the optional temporary surface film that can be used to protect the membrane from water.

FIG. 3 illustrates the surface-reinforced bitumen roofing membrane formed by a fiber mat that is connected to a bleed blocker layer, which bleed blocker layer is connected to the bitumen compound layer, which bitumen compound layer optionally includes release liner that is releasably connected to a bottom surface of the bitumen compound layer. The fiber mat is a non-woven mat that may or may not include binder. The bitumen compound layer may or may not include a reinforcement layer. The fibers in the fiber mat are optionally formed of fiberglass, and the fiber mat is optionally treated with a fire retardant. The surface-reinforced bitumen roofing membrane also optionally includes a removable release film that is releasably connected to the top mat to protect the membrane against water until the coating can be applied.

As can be appreciated, the fiber mat illustrated in FIG. 3 does not need to extend the full width of the bitumen compound layer, thus can only partially extend the full width of the bitumen compound layer as illustrated in FIG. 1 to create a lap line region on one or both sides of the surface-reinforced bitumen roofing membrane, thereby exposing a top surface of the bleed blocker layer. In such an optional arrangement, the lap line region can optionally include a release liner.

Figure 4:
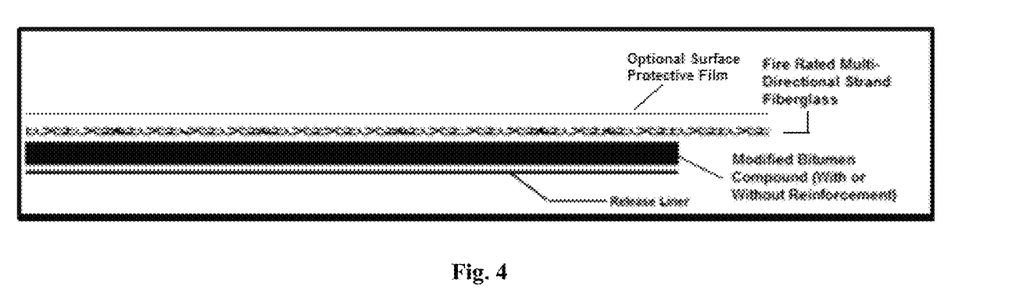
FIG. 4 illustrates the surface-reinforcement bitumen roofing membrane without a bleed blocker layer, and wherein the surface reinforcement optionally extends beyond the width of the modified bitumen membrane, and optionally runs along its entire length.

FIG. 4 illustrates the surface-reinforced bitumen roofing membrane formed by a fiber mat that is connected to a bitumen compound layer, which bitumen compound layer optionally includes a release liner that is releasably connected to a bottom surface of the bitumen compound layer. The fiber mat can be formed of multi-directional fibers that are secured together by a binder. As can be appreciated, the fiber mat can be a non-woven mat that may or may not include binder as illustrated in FIG. 3. The bitumen compound layer may or may not include a reinforcement layer. The fibers in the fiber mat are optionally formed of fiberglass, and the fiber mat is optionally treated with a fire retardant. The surface-reinforced bitumen roofing membrane also optionally includes a removable release film that is releasably connected to the top mat to protect the membrane against water until the coating can be applied. The fiber mat extends beyond the width of the bitumen compound layer and runs along the entirety of its length on one side, which will overlap the seam of an abutting modified bitumen sheet, which bitumen compound layer optionally includes release liner that is releasably connected to a bottom surface of the bitumen compound layer. Although not shown, the surface-reinforced bitumen roofing membrane can optionally include a bleed blocker layer, which bleed blocker layer is connected to the bitumen compound layer as illustrated in FIG. 2.

As can be appreciated, the fiber mat illustrated in FIG. 4 can only partially extend the full width of the bitumen compound layer as illustrated in FIG. 1 to create a lap line region on one side of the surface-reinforced bitumen roofing membrane, and the other side of the bitumen compound layer fiber mat extends beyond the width of the modified bitumen. The optional lap line region exposes a top surface of bitumen compound layer, or the top surface of the bleed blocker layer when such bleed blocker layer is used. In such an optional arrangement, the lap line region can optionally include a release liner.

As can be appreciated, any of the surface-reinforced bitumen roofing membranes illustrated in FIGS. 1-4 can include a) the formation of a lap line region on one or both sides of the surface-reinforced bitumen roofing membrane, b) a fiber mat that extends beyond the width of the bitumen compound layer on one or both sides of the surface-reinforced bitumen roofing membrane, or c) one side of the surface-reinforced bitumen roofing membrane includes a lap line region and the other side of the surface-reinforced bitumen roofing membrane the fiber mat that extends beyond the width of the bitumen compound layer.

Figure 5:
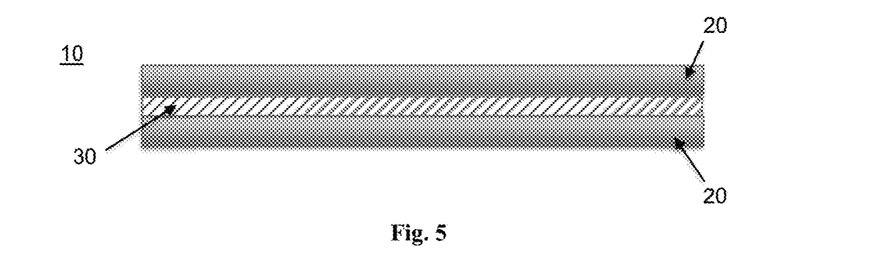
FIG. 5 illustrates a bitumen compound layer that includes an optional reinforcement layer within the primary hydrocarbon compound.

FIG. 5 illustrates a bitumen compound layer 10 that includes an optional reinforcement layer 30 positioned within the primary hydrocarbon compound 20. As illustrated in FIG. 5, optional reinforcement layer 30 is position in the middle of bitumen compound layer 10; however, it will be appreciated, that reinforcement layer 30 can be located closer to the top or bottom of bitumen compound layer 10. Generally, reinforcement layer 30 is spaced from the top and bottom surface of bitumen compound layer 10.

Figure 6:
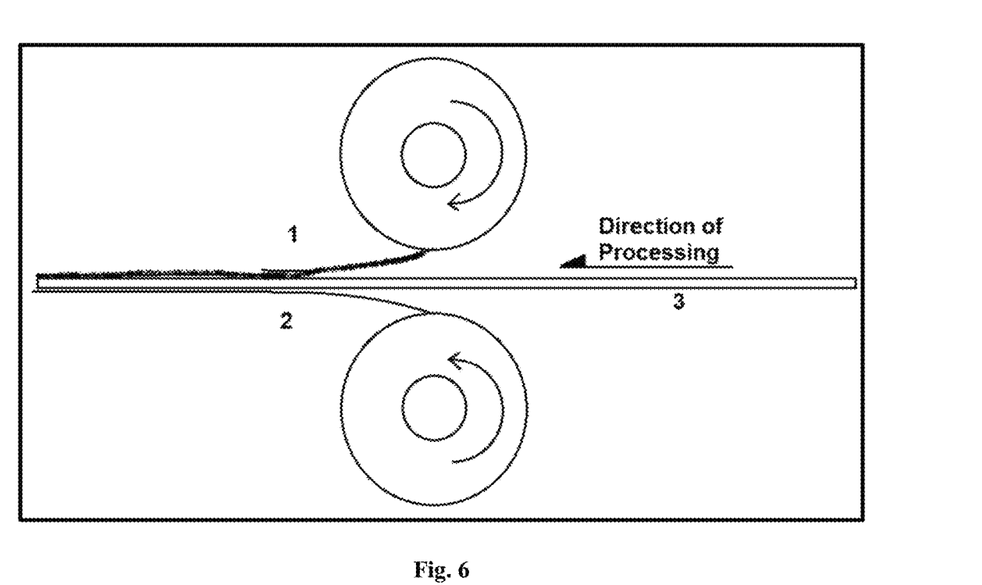
FIG. 6 illustrates a continuous feed process for applying the fiber mat and release film to the bitumen compound layer during manufacturing of the surface-reinforced bitumen roofing membrane.

FIG. 6 illustrates a non-limiting manufacturing process for forming the surface-reinforced bitumen roofing membrane. A continuous feed process is illustrated for applying the optional surface protective film and the fiber mat to the top surface of the bitumen compound layer and an optional release liner to the bottom surface of the bitumen compound layer. The manufacturing process for forming the surface-reinforced bitumen roofing membrane can be by continuous feed or with cut sections of a set length.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed is:

1. A surface-reinforced bitumen roofing membrane that includes a bitumen compound layer, a fiber mat that is position on or above at least a portion of a top surface of said bitumen compound layer, a bleed blocker layer located between said bitumen compound layer and said fiber mat, and a release liner; said release liner is a) releasably positioned on a bottom surface of said surface-reinforced bitumen roofing membrane, and/or b) releasably positioned on a top surface of said surface-reinforced bitumen roofing membrane; said bitumen compound layer comprises by weight percent:

| | |
|---|---|
| Primary hydrocarbon compound | 25-80 wt. % |
| Filler | 0.5-60 wt. % |
| Polymer Modifier | 0.05-25 wt. % |
| Hydrocarbon Resin Process Oil | 0.05-20 wt. %; | and wherein said weight percentages of said bitumen compound layer excludes any internal reinforcement layer in said bitumen compound layer.

2. The surface-reinforced bitumen roofing membrane as defined in claim 1, wherein said bitumen compound layer comprises by weight percent:

| | |
|---|---|
| Primary hydrocarbon compound | 25-60 wt. % |
| Filler | 0.5-50 wt. % |
| Polymer Modifier | 0.05-20 wt. % |
| Hydrocarbon Resin Process Oil | 0.05-15 wt. %; | and wherein said weight percentage exclude any internal reinforcement layer in said bitumen compound layer.

3. The surface-reinforced bitumen roofing membrane as defined in claim 1, wherein said bitumen compound layer comprises by weight percent:

| | |
|---|---|
| Primary hydrocarbon compound | 25-55 wt. % |
| Filler | 0.05-45 wt. % |
| Polymer Modifier | 0.05-10 wt. % |
| Hydrocarbon Resin Process Oil | 0.05-5 wt. %; | and wherein said weight percentage exclude any internal reinforcement layer in said bitumen compound layer.

4. The surface-reinforced bitumen roofing membrane as defined in claim 1, wherein said bitumen compound layer comprises by weight percent:

| | |
|---|---|
| Primary hydrocarbon compound | 40-80 wt. % |
| Filler | 0-60 wt. % |
| Internal Reinforcement Fibers | 0-30 wt. % |
| Polymer Modifier | 1-25 wt.; | and wherein said weight percentage exclude any internal reinforcement layer in said bitumen compound layer.

5. The surface-reinforced bitumen roofing membrane as defined in claim 1, wherein said bitumen compound layer comprises by weight percent:

| | |
|---|---|
| Primary hydrocarbon compound | 25-60 wt. % |
| Filler | 25-60 wt. % |
| Internal Reinforcement Fibers | 0-20 wt. % |
| Polymer Modifier | 2-20 wt. %; | and wherein said weight percentage exclude any internal reinforcement layer in said bitumen compound layer.

6. The surface-reinforced bitumen roofing membrane as defined in claim 1, wherein said bitumen compound layer comprises by weight percent:

| | |
|---|---|
| Primary hydrocarbon compound | 40-50 wt. % |
| Filler | 35-50 wt. % |
| Internal Reinforcement Fibers | 0-20 wt. % |
| Polymer Modifier | 4-8 wt. %; | and wherein said weight percentage exclude any internal reinforcement layer in said bitumen compound layer.

7. The surface-reinforced bitumen roofing membrane as defined in claim 1, wherein said fiber mat is 2-60 mil in thickness.

8. The surface-reinforced bitumen roofing membrane as defined in claim 1, wherein a thickness of said bleed blocker layer is 0.1 mil-40 mils.

9. The surface-reinforced bitumen roofing membrane as defined in claim 1, wherein said bleed blocker layer includes a) a coating formed of a one or more materials selected from the group consisting of acrylic coating, polyvinyl alcohol coating, nitrile rubber coating, thermoplastic urethane coating, polyamide coating, vinyl acetate coating, latex coating, SBR coating, SBS coating, SEBS coating, SIS coating, natural or synthetic rubber coating, low density polyethylene (LDPE) coating, linear low density polyethylene (LLDPE) coating, medium density polyethylene (MDPE) coating, high density polyethylene (HDPE) coating, cast unrented polypropylene (CPP) coating, biaxially oriented polypropylene (BOPP) coating, polyethylene/polyamide (PE/PA) coating, polyester coating, polyethylene terephthalate coating, polyurethane coating, polyamide coating, silicone coating, polyurethane coating, and poly(methyl methacrylate) coating, or b) one or more single ply sheets selected from the group consisting of thermoplastic olefin, thermoplastic polyolefin), EPDM (ethylene propylene diene monomer), PVC (polyvinyl chloride), CSPE (chlorosulfonated polyethylene), EPM (ethylene propylene monomer), and KEE (ketone ethylene ester).

10. The surface-reinforced bitumen roofing membrane as defined in claim 1, further including a liquid applied coating that partially or fully encapsulates said fiber mat and/or partially or fully impregnates said fiber mat.

11. The surface-reinforced bitumen roofing membrane as defined in claim 10, wherein said liquid applied coating includes one or more of polyurethane, polyurea, poly(methyl methacrylate), an elastomeric, and/or silicone.

12. A surface-reinforced bitumen roofing membrane that includes a bitumen compound layer, a fiber mat that is position on or above at least a portion of a top surface of said bitumen compound layer, a bleed blocker layer located between said bitumen compound layer and said fiber mat, and a liquid applied coating that partially or fully encapsulates said fiber mat and/or partially or fully impregnates said fiber mat; said bitumen compound layer comprises by weight percent:

| | |
|---|---|
| Primary hydrocarbon compound | 25-80 wt. % |
| Filler | 0.5-60 wt. % |
| Polymer Modifier | 0.05-25 wt. % |
| Hydrocarbon Resin Process Oil | 0.05-20 wt. %; | and wherein said weight percentages of said bitumen compound layer excludes any internal reinforcement layer in said bitumen compound layer.

13. The surface-reinforced bitumen roofing membrane as defined in claim 12, further including a release liner; said release liner is a) releasably positioned on a bottom surface of said surface-reinforced bitumen roofing membrane, and/or b) releasably positioned on a top surface of said surface-reinforced bitumen roofing membrane.

14. The surface-reinforced bitumen roofing membrane as defined in claim 12, wherein said bleed blocker layer includes a) a coating formed of a one or more materials selected from the group consisting of acrylic coating, polyvinyl alcohol coating, nitrile rubber coating, thermoplastic urethane coating, polyamide coating, vinyl acetate coating, latex coating, SBR coating, SBS coating, SEBS coating, SIS coating, natural or synthetic rubber coating, low density polyethylene (LDPE) coating, linear low density polyethylene (LLDPE) coating, medium density polyethylene (MDPE) coating, high density polyethylene (HDPE) coating, cast unrented polypropylene (CPP) coating, biaxially oriented polypropylene (BOPP) coating, polyethylene/polyamide (PE/PA) coating, polyester coating, polyethylene terephthalate coating, polyurethane coating, polyamide coating, silicone coating, polyurethane coating, and poly(methyl methacrylate) coating, or b) one or more single ply sheets selected from the group consisting of thermoplastic olefin, thermoplastic polyolefin), EPDM (ethylene propylene diene monomer), PVC (polyvinyl chloride), CSPE (chlorosulfonated polyethylene), EPM (ethylene propylene monomer), and KEE (ketone ethylene ester).

15. The surface-reinforced bitumen roofing membrane as defined in claim 12, wherein said liquid applied coating includes one or more of polyurethane, polyurea, poly(methyl methacrylate), an elastomeric, and/or silicone.

16. A method for using a roof membrane comprising:
a) providing a surface-reinforced bitumen roofing membrane that includes a bitumen compound layer, a fiber mat that is position on or above at least a portion of a top surface of said bitumen compound layer, a bleed blocker layer located between said bitumen compound layer and said fiber mat, and a release liner; said release liner is a) releasably positioned on a bottom surface of said surface-reinforced bitumen roofing membrane, and/or b) releasably positioned on a top surface of said surface-reinforced bitumen roofing membrane; said bitumen compound layer comprises by weight percent:

| | |
|---|---|
| Primary hydrocarbon compound | 25-80 wt. % |
| Filler | 0.5-60 wt. % |
| Polymer Modifier | 0.05-25 wt. % |
| Hydrocarbon Resin Process Oil | 0.05-20 wt. %; | and wherein said weight percentages of said bitumen compound layer excludes any internal reinforcement layer in said bitumen compound layer; and
b) applying said surface-reinforced bitumen roofing membrane on to a roof surface.

17. A method for using a roof membrane comprising:
a) providing a surface-reinforced bitumen roofing membrane that includes a bitumen compound layer, a fiber mat that is position on or above at least a portion of a top surface of said bitumen compound layer, a bleed blocker layer located between said bitumen compound layer and said fiber mat, and a liquid applied coating that partially or fully encapsulates said fiber mat and/or partially or fully impregnates said fiber mat; said bitumen compound layer comprises by weight percent:

| | |
|---|---|
| Primary hydrocarbon compound | 25-80 wt. % |
| Filler | 0.5-60 wt. % |
| Polymer Modifier | 0.05-25 wt. % |
| Hydrocarbon Resin Process Oil | 0.05-20 wt. %; | and wherein said weight percentages of said bitumen compound layer excludes any internal reinforcement layer in said bitumen compound layer; and
b) applying said surface-reinforced bitumen roofing membrane on to a roof surface.

18. A surface-reinforced bitumen roofing membrane that includes a bitumen compound layer, a fiber mat that is position on or above at least a portion of a top surface of said bitumen compound layer, a bleed blocker layer located between said bitumen compound layer and said fiber mat, and one or more of a) a release liner that is i) releasably positioned on a bottom surface of said surface-reinforced bitumen roofing membrane, and/or ii) releasably positioned on a top surface of said surface-reinforced bitumen roofing membrane, and/or b) a liquid applied coating that partially or fully encapsulates said fiber mat and/or partially or fully impregnates said fiber mat; said bitumen compound layer includes primary hydrocarbon compound, filler and one or more of polymer modifier and/or hydrocarbon resin process oil.

19. The surface-reinforced bitumen roofing membrane as defined in claim 18, wherein said bitumen compound layer comprises 25-80 wt. % primary hydrocarbon compound, 0.5-60 wt. % filler, 0.05-25 wt. % polymer modifier, and 0.05-20 wt. % hydrocarbon resin process oil, and wherein said weight percentages of said bitumen compound layer excludes any internal reinforcement layer in said bitumen compound layer.

20. The surface-reinforced bitumen roofing membrane as defined in claim 18, wherein a) a thickness of said fiber mat is 2-60 mil, and/or b) a thickness of said bleed blocker layer is 0.1 mil-40 mils.

21. The surface-reinforced bitumen roofing membrane as defined in claim 19, wherein a) a thickness of said fiber mat is 2-60 mil, and/or b) a thickness of said bleed blocker layer is 0.1 mil-40 mils.

22. The surface-reinforced bitumen roofing membrane as defined in claim 18, wherein said bleed blocker layer includes a) a coating formed of a one or more materials selected from the group consisting of acrylic coating, polyvinyl alcohol coating, nitrile rubber coating, thermoplastic urethane coating, polyamide coating, vinyl acetate coating, latex coating, SBR coating, SBS coating, SEBS coating, SIS coating, natural or synthetic rubber coating, low density polyethylene (LDPE) coating, linear low density polyethylene (LLDPE) coating, medium density polyethylene (MDPE) coating, high density polyethylene (HDPE) coating, cast unrented polypropylene (CPP) coating, biaxially oriented polypropylene (BOPP) coating, polyethylene/polyamide (PE/PA) coating, polyester coating, polyethylene terephthalate coating, polyurethane coating, polyamide coating, silicone coating, polyurethane coating, and poly(methyl methacrylate) coating, or b) one or more single ply sheets selected from the group consisting of thermoplastic olefin, thermoplastic polyolefin), EPDM (ethylene propylene diene monomer), PVC (polyvinyl chloride), CSPE (chlorosulfonated polyethylene), EPM (ethylene propylene monomer), and KEE (ketone ethylene ester).

23. The surface-reinforced bitumen roofing membrane as defined in claim 21, wherein said bleed blocker layer includes a) a coating formed of a one or more materials selected from the group consisting of acrylic coating, polyvinyl alcohol coating, nitrile rubber coating, thermoplastic urethane coating, polyamide coating, vinyl acetate coating, latex coating, SBR coating, SBS coating, SEBS coating, SIS coating, natural or synthetic rubber coating, low density polyethylene (LDPE) coating, linear low density polyethylene (LLDPE) coating, medium density polyethylene (MDPE) coating, high density polyethylene (HDPE) coating, cast unrented polypropylene (CPP) coating, biaxially oriented polypropylene (BOPP) coating, polyethylene/polyamide (PE/PA) coating, polyester coating, polyethylene terephthalate coating, polyurethane coating, polyamide coating, silicone coating, polyurethane coating, and poly(methyl methacrylate) coating, or b) one or more single ply sheets selected from the group consisting of thermoplastic olefin, thermoplastic polyolefin), EPDM (ethylene propylene diene monomer), PVC (polyvinyl chloride), CSPE (chlorosulfonated polyethylene), EPM (ethylene propylene monomer), and KEE (ketone ethylene ester).

24. The surface-reinforced bitumen roofing membrane as defined in claim 18, wherein said surface-reinforced bitumen roofing membrane includes said liquid applied coating; said liquid applied coating includes one or more of polyurethane, polyurea, poly(methyl methacrylate), an elastomeric, and/or silicone.

25. The surface-reinforced bitumen roofing membrane as defined in claim 23, wherein said surface-reinforced bitumen roofing membrane includes said liquid applied coating; said liquid applied coating includes one or more of polyurethane, polyurea, poly(methyl methacrylate), an elastomeric, and/or silicone.

\* \* \* \* \*